United States Patent

Bullard et al.

Patent Number: 5,902,684
Date of Patent: *May 11, 1999

[54] MULTILAYERED METALLOCENE STRETCH WRAP FILMS

[75] Inventors: Edward M. Bullard, Rochester; David V. Dobreski, Fairport, both of N.Y.; George N. Eichbauer, Conyers, Ga.; Richard E. Leone, Newark, N.Y.; W. Mark Dutt, Gurnee, Ill.

[73] Assignee: Tenneco Packaging Inc., Evanston, Ill.

[*] Notice: This patent is subject to a terminal disclaimer.

[21] Appl. No.: 08/886,953

[22] Filed: Jul. 2, 1997

Related U.S. Application Data

[63] Continuation-in-part of application No. 08/614,380, Mar. 12, 1996, Pat. No. 5,814,399, which is a continuation-in-part of application No. 08/614,310, Mar. 12, 1996.

[51] Int. Cl.⁶ .................................... B32B 27/32
[52] U.S. Cl. ........................ 428/515; 53/399; 53/441; 53/449; 428/516; 428/520
[58] Field of Search .................... 428/515, 516, 428/520; 53/399, 441, 449

[56] References Cited

U.S. PATENT DOCUMENTS

| | | | |
|---|---|---|---|
| 3,645,992 | 2/1972 | Elston | 526/169.2 |
| 3,748,962 | 7/1973 | Hilkert et al. | 409/14 |
| 3,986,611 | 10/1976 | Dreher | 206/597 |
| 4,011,382 | 3/1977 | Levine et al. | 526/96 |
| 4,050,221 | 9/1977 | Lancaster, III et al. | 53/211 |
| 4,076,698 | 2/1978 | Anderson et al. | 526/348.6 |

(List continued on next page.)

FOREIGN PATENT DOCUMENTS

| | | | |
|---|---|---|---|
| 0600425 | 11/1993 | European Pat. Off. | B32B 27/32 |
| WO 92/17539 | 10/1992 | WIPO | C08L 23/06 |
| WO 4/14855 | 7/1994 | WIPO | C08F 4/628 |
| WO 94/25271 | 11/1994 | WIPO | B32B 07/08 |
| WO 94/26816 | 11/1994 | WIPO | C08L 23/08 |

OTHER PUBLICATIONS

Leaversuch, R., "LDPE, mPE vie in Flexible Film Market", Modern Plastics, September 1994, pp. 23 & 25.

Product Literature, To Give Your Customers' Used Stretch Film A New Lease On Life, Turn The Page, Mobil, 4p. 1993.

(List continued on next page.)

*Primary Examiner*—D. S. Nakarani
*Attorney, Agent, or Firm*—Arnold White & Durkee

[57] ABSTRACT

A multilayer, thermoplastic stretch wrap film containing at least four polymeric film layers and comprised of a first outer cling layer, a second outer cling layer, at least one inner polymeric layer and at least one core layer. The first and second layers have a cling force to s each other of at least about 140 grams/inch. The stretch wrap film has at least one inner polymeric layer, located between the first and second layers. The inner polymeric layer comprises a low polydispersity polymer. The low polydispersity polymer has a polydispersity of from about 1 to about 4, a melt index ($I_2$) of from about 0.5 to about 10 g/10 min., and a melt flow ratio ($I_{20}/I_2$) of from about 12 to about 22. The core layer, also located between the outer cling layers, comprises either a random copolymer of propylene and ethylene, a heterophasic copolymer of propylene with domains of ethylene interspersed, a polypropylene homopolymer, or blends thereof. The random ethylene-propylene copolymer has a melt flow ratio of from about 2 to about 15 and an ethylene content in the range of from about 2 to about 6 wt. % of the propylene copolymer. The heterophasic copolymer has a melt flow ratio of about 10 to about 18 and an ethylene content in the range of from about 12 to 30 wt. % of the heterophasic propylene. The polypropylene homopolymer has a melt flow ratio of from about 2 to about 15. The multilayer stretch wrap film has a maximum stretch of at least 340% and a machine direction stress force @ 200% elongation of between about 1400 and about 1900 psi. It is contemplated that additional layers may be added to the present invention.

93 Claims, 1 Drawing Sheet

U.S. PATENT DOCUMENTS

| | | | |
|---|---|---|---|
| 4,163,831 | 8/1979 | Gessell | 526/153 |
| 4,205,021 | 5/1980 | Morita et al. | 525/240 |
| 4,302,565 | 11/1981 | Goeke et al. | 526/88 |
| 4,302,566 | 11/1981 | Karol et al. | 526/125 |
| 4,359,561 | 11/1982 | Fraser et al. | 526/88 |
| 4,399,173 | 8/1983 | Anthony et al. | 428/35 |
| 4,399,180 | 8/1983 | Briggs et al. | 428/212 |
| 4,418,114 | 11/1983 | Briggs et al. | 428/218 |
| 4,461,873 | 7/1984 | Bailey et al. | 525/240 |
| 4,511,609 | 4/1985 | Craver et al. | 428/35 |
| 4,522,987 | 6/1985 | Hogan et al. | 526/106 |
| 4,565,720 | 1/1986 | Yaeo et al. | 428/35 |
| 4,574,104 | 3/1986 | Aishima et al. | 428/220 |
| 4,588,650 | 5/1986 | Mientus et al. | 428/516 |
| 4,808,561 | 2/1989 | Welborn, Jr. | 502/104 |
| 4,833,017 | 5/1989 | Benoit | 428/323 |
| 4,871,523 | 10/1989 | Datta et al. | 423/265 |
| 4,871,705 | 10/1989 | Hoel | 502/117 |
| 4,925,821 | 5/1990 | Chang | 502/107 |
| 4,925,825 | 5/1990 | Tachi et al. | 502/309 |
| 4,937,301 | 6/1990 | Chang | 526/128 |
| 5,001,205 | 3/1991 | Hoel | 526/128 |
| 5,006,500 | 4/1991 | Chang | 502/107 |
| 5,017,655 | 5/1991 | Kase et al. | 525/127 |
| 5,019,315 | 5/1991 | Wilson | 264/171 |
| 5,026,798 | 6/1991 | Canich | 526/127 |
| 5,032,652 | 7/1991 | Chang | 526/129 |
| 5,049,423 | 9/1991 | German, Jr. | 428/35.2 |
| 5,079,205 | 1/1992 | Canich | 502/117 |
| 5,084,534 | 1/1992 | Welborn, Jr. et al. | 526/160 |
| 5,085,927 | 2/1992 | Dohrer | 428/220 |
| 5,124,418 | 6/1992 | Welborn, Jr. | 526/114 |
| 5,173,343 | 12/1992 | Arvedson et al. | 428/34.9 |
| 5,183,867 | 2/1993 | Welborn, Jr. | 526/114 |
| 5,206,075 | 4/1993 | Hodgson, Jr. | 428/216 |
| 5,248,547 | 9/1993 | Wilson | 428/218 |
| 5,272,016 | 12/1993 | Ralph | 428/516 |
| 5,273,809 | 12/1993 | Simmons | 428/212 |
| 5,278,272 | 1/1994 | Lai et al. | 526/348.5 |
| 5,279,872 | 1/1994 | Ralph | 428/34.9 |
| 5,283,128 | 2/1994 | Wilhoit | 428/516 |
| 5,296,580 | 3/1994 | Matsunaga et al. | 528/502 |
| 5,334,428 | 8/1994 | Dobreski et al. | 428/34.9 |
| 5,358,792 | 10/1994 | Mehta et al. | 428/516 |
| 5,374,459 | 12/1994 | Mumpower et al. | 428/36.7 |
| 5,376,439 | 12/1994 | Hodgson et al. | 428/220 |
| 5,380,810 | 1/1995 | Lai et al. | 56/352 |
| 5,382,631 | 1/1995 | Stehling et al. | 525/240 |
| 5,395,471 | 3/1995 | Obijeski et al. | 156/244.11 |
| 5,397,613 | 3/1995 | Georgelos | 428/36.7 |
| 5,397,640 | 3/1995 | Georgelos et al. | 428/349 |
| 5,399,426 | 3/1995 | Koch et al. | 428/335 |
| 5,407,732 | 4/1995 | Dokurno | 428/213 |
| 5,419,795 | 5/1995 | Wood et al. | 156/184 |
| 5,419,934 | 5/1995 | Wilson | 428/34.9 |
| 5,420,220 | 5/1995 | Cheruvu et al. | 526/348.1 |
| 5,431,284 | 7/1995 | Wilson | 206/597 |
| 5,451,450 | 9/1995 | Erderly et al. | 428/220 |
| 5,451,468 | 9/1995 | Seiler et al. | 428/515 |
| 5,460,861 | 10/1995 | Vicik et al. | 428/34.9 |
| 5,462,807 | 10/1995 | Halle et al. | 428/500 |
| 5,482,770 | 1/1996 | Bekele | 428/339 |
| 5,482,771 | 1/1996 | Shah | 428/349 |
| 5,491,019 | 2/1996 | Kuo | 428/213 |
| 5,523,136 | 6/1996 | Fischer et al. | 428/35.2 |
| 5,530,065 | 6/1996 | Farley et al. | 525/240 |
| 5,543,223 | 8/1996 | Shah | 428/349 |
| 5,558,930 | 9/1996 | DiPoto | 428/216 |
| 5,595,050 | 1/1997 | Koch et al. | 53/441 |
| 5,617,707 | 4/1997 | Simmons | 53/441 |

OTHER PUBLICATIONS

Chowdhury, et al., "Polymers by Blueprint: Metallocene catalysts, the biggest thing to hit plastics since LLDPE, transform workhorse resins into engineering plastics", *Chemical Engineering* (04/93), pp. 34–39.

Schut, "Competition for Metallocenes Could Turn Ugly", *Plastics World* (01/95), pp. 33–36.

Product Literature, Dow Chemical Company, "Dow Resins for Stretch Film Applications–An Overview", p. 1.5, Oct., 1994.

Product Literature, Dow Chemical Company, "Dow Skin Resins for Cast Stretch Film Applications", p. 3.1–3.4 Oct., 1994.

Product Literature, Dow Chemical Company, "ENGAGE Polyolefin Elastomer for Industrial Collation Packaging", KC 8852, May, 1994.

"Advantages of Metallocene Ethylene Polymer Resin Blends in Blown and Cast Films", Research Disclosure, Aug. 1995, pp. 565–573.

"Advantages of Metallocene Ethylene Polymer Resin Blends in Cast Film", Research Disclosure, Aug. 1995, pp. 556–557.

"Advantages of Metallocene Ethylene Polymer Resins in Blown and Cast Stretch Films", Research Disclosure, Aug. 1995, pp. 539–545.

MULTILAYERED METALLOCENE STRETCH WRAP FILMS

CROSS REFERENCE TO RELATED APPLICATIONS

This application is a continuation-in-part of U.S. application Ser. No. 08/614,380 filed Mar. 12, 1996, now U.S. Pat. No. 5,814,399 for "Stretch Wrap Films" which is a cont-in-part of application Ser. No. 08/614,310 filed Mar. 12, 1996 now pending for "Stretch Wrap Films".

FIELD OF INVENTION

The present invention is directed to stretch wrap films and methods for their use. In particular, the present invention is directed to stretch wrap films having excellent maximum stretch, moderate holding force, superior puncture resistance, high total energy dart drop, high cling force and overall strength.

BACKGROUND OF THE INVENTION

The use of thermoplastic stretch wrap films for the overwrap packaging of goods, and in particular, the unitizing of palleted loads is a significant commercially important application of polymer film, including generically, polyethylene. Overwrapping a plurality of articles to provide a unitized load can be achieved by a variety of techniques. In one procedure, the load to be wrapped is positioned on a platform, or turntable, which is made to rotate and in so doing, to take up stretch wrap film supplied from a continuous roll. Braking tension is applied to the film roll so that the film is continuously subjected to a stretching or tensioning force as it wraps around the rotating load in overlapping layers. Generally, the stretch wrap film is supplied from a vertically arranged roll positioned adjacent to the rotating pallet load. Rotational speeds of from about 5 to about 50 revolutions per minute are common.

At the completion of the overwrap operation, the turntable is completely stopped and the film is cut and attached to an underlying layer of film employing tack sealing, adhesive tape, spray adhesives, etc. Depending upon the width of the stretch wrap roll, the load being overwrapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods.

Another wrapping method finding acceptance in industry today is that of hand wrapping. In this method, the film is again arranged on a roll, however, it is hand held by the operator who walks around the goods to be wrapped, applying the film to the goods. The roll of film so used may be installed on a hand-held wrapping tool for ease of use by the operator.

Some of the properties desired of a good stretch wrap film are as follows: good cling or cohesion properties, high puncture resistance, good machine direction tear resistance, good transparency, low haze, low stress relaxation with time, high resistance to transverse tear especially when under machine direction tension, producible in thin gauges, low specific gravity and thus high yield in area per pound, good tensile toughness, high machine direction ultimate tensile strength, high machine direction ultimate elongation, and low modulus of elasticity.

Currently, different grades of stretch wrap films are commonly marketed for different end uses according to overall film properties. For example, certain stretch wrap films have superior properties for load retention, but these films are characterized by having poor stretching characteristics. On the other hand, certain stretch wrap films having superior stretching properties have low load retention properties, thus limiting their use.

A need exists to develop superior stretch wrap films characterized by having moderate load retention characteristics and excellent stretching characteristics while still maintaining other important stretch film properties. Such films could be used in a wider variety of end applications and, thus, not unduly limit users of stretch wrap films to selectively choosing a film based on its properties prior to initiating a stretch wrap application.

SUMMARY OF THE INVENTION

The present invention is a multilayered film which has excellent stretch properties at a moderate load retention, excellent puncture resistance, total energy dart drop, high cling force and overall strength. The inventive film comprises outer cling layers, at least one inner polymeric layer and at least one core layer. The stretch wrap films of the present invention are designed for use in cling/cling film applications.

The outer cling layers may be constructed of olefin polymer resins. The outer cling layers are preferably constructed with a copolymer or a terpolymer of ethylene and a minor amount of at least one alpha olefin of from about 3 to about 12 carbon atoms. The outer cling layers have a cling force to each other of at least about 140 g/inch.

The inner polymeric layer, located at a position between the first and second cling layers, comprises a polymer having a low polydispersity. The low polydispersity polymer has a polydispersity of from about 1 to about 4, a melt index ($I_2$) of from about 0.5 to about 10 g/10 min., and a melt flow ratio ($I_{20}/I_2$) of from about 12 to about 22. The inner polymeric layer(s) are preferably produced utilizing metallocene catalyst polymerization techniques. The inner polymeric layer may comprise a blend of resins with the low polydispersity polymer.

The core layer is also located at a position between the outer cling layers. The core layer may be comprised of a copolymer of propylene and ethylene having an ethylene content of from about 2 wt. % to about 6 wt. % and a melt flow ratio ($I_{20}/I_2$) of from about 2 to about 15. According to another embodiment, the core layer is comprised of a heterophasic copolymer of propylene and ethylene having a melt flow ratio ($I_{20}/I_2$) of from about 10 to about 18 and an ethylene content of from about 12 to about 30 wt. %. According to yet another embodiment, the core layer is comprised of a polypropylene copolymer having a melt flow ratio of from about 2 to about 15. It is contemplated that the core layer may be comprised of blends of the above-described resins.

The film is constructed with at least four layers; additional layers are contemplated. For instance, additional inner polymeric layers may be incorporated into the film between the outer cling layers, where such layers are constructed with the same or different metallocene-catalyzed polyethylene resins as the first inner polymeric layer.

The multilayer film of the present invention will have a maximum stretch of at least 340%, and a machine direction stress level at 200% elongation of from about 1400 to about 1900 psi.

DESCRIPTION OF ILLUSTRATIVE EMBODIMENTS

The multilayer stretch wrap films of the present invention are constructed with a first and a second outer cling layer, at least one inner polymeric layer and at least one core layer located at between the outer cling layers. The multilayer stretch wrap films of the present invention can be prepared as cast films by conventional coextrusion techniques. The stretch wrap films of the present invention are used in cling/cling applications.

OUTER CLING LAYERS

The outer cling layers of the stretch wrap films of the present invention may be constructed of olefin polymer resins. Suitable polyethylene resins are those ethylenic copolymers that comprise a major proportion by weight of ethylene copolymerized with a minor proportion by weight of an alpha olefin monomer containing about 3 to about 12, preferably about 4 to about 10, and more preferably about 4 to about 8, carbon atoms. These resins have a polydispersity which is preferably in the range of from about 3 to about 7.

Ethylenic copolymers are those commonly referred to as linear low density polyethylenes (LLDPE) and very low density polyethylenes (VLDPE). Preferably the ethylenic copolymers employed are those having from about 1 to about 20, preferably from about 1 to about 10 weight percent of said higher alpha olefin monomer copolymerized therein. In addition, the alpha olefin monomer employed in the ethylenic copolymer is selected from the group consisting of 1-butene, 3-methyl-1-butene, 3-methyl-1-pentene, 1-hexene, 4-methyl-1-pentene, 3-methyl-1-hexene, 1-octene and 1-decene. Particularly preferred are the 1-hexene alpha olefins. The LLDPE resins are prepared at relatively low pressures employing coordination-type catalysts. Reference may be made to U.S. Pat. Nos. 3,645,992, 4,076,698, 4,011,382, 4,163,831, 4,205,021, 4,302,565, 4,302,566, 4,359,561 and 4,522,987 for more details of the manufacture and properties of LLDPE resins including those which are particularly useful herein.

The polyethylene resins that are desired to be used as the outer cling layers in the films of the present invention are those that are functionally defined as providing a cling force of at least about 140, preferably at least about 180, more preferably at least about 220, and in some cases at least about 260 grams/inch, as determined by the ASTM D 5458-94 test method. Generally, the cling force of the outer cling layers will be in the range of from about 140 to about 280 grams/inch.

Common LLDPE resins that may be used to form such an outer cling layer include those having a relatively high weight percentage of n-hexane extractibles, as measured by the n-hexane extractibles method of 21 C.F.R. 177.1520. Generally, the LLDPE used in the outer cling layers herein will contain from about 2 to about 10, preferably from about 2 to about 8, more preferably from about 2.5 to about 5, weight percent of n-hexane extractables.

The LLDPE resins that can be used in the outer cling layers herein have a density ranging from about 0.890 to about 0.940 g/cm$^3$, more commonly from about 0.90 to about 0.93 g/cm$^3$, and a melt index ($I_2$) of from about 1 to about 10 g/10 min., as determined by ASTM D1238. Particularly preferred are those LLDPE resins possessing densities within the range from about 0.917 to about 0.920 gm/cm$^3$ and a melt index of from about 2.0 to about 5.0 g/10 min., as determined by ASTM D1238. Examples of such LLDPE resins include those set forth in U.S. Pat. No. 5,273,809, which is incorporated herein by reference in its entirety.

The VLDPE resins that may be used in the outer cling layers herein have a density ranging from about 0.880 to about 0.912 g/cm$^3$, more commonly from about 0.89 to about 0.91 g/cm$^3$, and a melt index of from about 0.5 to about 5 g/10 min., preferably from about 1 to about 3 g/10 min.

The LLDPE and VLDPE resins that can be used in the outer cling layers can be blended with minor amounts, e.g., up to about 40 weight percent total, of one or more other suitable resins to achieve a desired range of physical/mechanical properties in the film product. Thus, for example, such resins as ethyl vinyl acetate (EVA) copolymer, high pressure low density polyethylene (HPLDPE), and other LLDPE resins may be used for blending to obtain useful mixtures for forming the outer cling layers of the films of the present invention.

The LLDPE and VLDPE resins that can be used in the outer cling layers herein may also contain known and conventional cling additives to augment the cling property that, at least in the case of the particularity preferred resins, is inherently exhibited. Examples of useful cling additives include poly-isobutylenes having a number average molecular weight in the range from about 1,000 to about 3,000, preferably about 1,200 to about 1,800, as measured by vapor phase osmometry, amorphous atactic polypropylenes, e.g., those having an average molecular weight of about 2000, and polyterpenes and ethylene-vinyl acetate copolymers containing from about 5 to about 15 weight percent copolymerized vinyl acetate. The optional cling additive can be present in the outer cling layers in a concentration of from about 0.5 to about 10 weight percent of the resin. Of course, other conventional film additives such as antioxidants, UV stabilizers, pigments, dyes, etc., may be present in the usual amounts.

It is preferred to utilize the LLDPE resins that contain relatively high weight percentages of n-hexane extractables for both the first and second layers due to overall performance results. However, one or both of the first and second layers may comprise, for example, a first ethylene monomer and a second monomer that comprises an acrylate. On example is an ethylene-acrylate (EA) polymer film shown in U.S. Pat. No. 5,049,423, which is incorporated herein by reference in its entirety. These EA polymers generally have an acrylate content between about 2 to about 40%, preferably between about 10 to about 35%, by weight of the EA polymer. The acrylate useful in these polymers are those generally known in the art, preferably methyl, ethyl, and n-butyl acrylate. Other known cling layers are contemplated for the present invention.

Either or both of the outer cling layers of the film can be treated by such known and conventional post-forming operations as corona discharge, chemical treatment, flame treatment, etc., to modify the printability or ink receptivity of the surface(s) or to impart other desirable characteristics thereto.

INNER POLYMERIC LAYER

The multilayer stretch wrap films of the present invention are constructed with at least one inner polymeric layer comprising a polymer resin having a low polydispersity and located between the outer cling layers. The inner polymeric layer comprises a polymer having a low polydispersity. The low polydispersity polymer may be prepared from a partially crystalline polyethylene resin that is a polymer prepared with ethylene and at least one alpha olefin monomer, e.g., a copolymer or terpolymer. The alpha olefin monomer generally has from about 3 to about 12 carbon atoms, preferably from about 4 to about 10 carbon atoms, and more preferably from about 6 to about 8 carbon atoms. The alpha olefin comonomer content is generally below about 30 weight percent, preferably below about 20 weight percent, and more preferably from about 1 to about 15 weight percent. Exemplary comonomers include propylene, 1-butene, 1-pentene, 1-hexene, 3-methyl-1-pentene,4-methyl-1-pentene, 1-octene, 1-decene, and 1-dodecene.

The low polydispersity polymer generally has the characteristics associated with an LLDPE material, however it has improved properties as explained more fully below. The low polydispersity polymer defined herein will have a density of from about 0.88 to about 0.94 g/cm$^3$, preferably from about 0.88 to about 0.93 g/cm$^3$, and more preferably from about 0.88 to about 0.925 g/cm$^3$.

The average molecular weight of the copolymer can generally range from about 20,000 to about 500,000, preferably from about 50,000 to about 200,000. The molecular weight is determined by commonly used techniques such as size exclusion chromatography or gel permeation chromatography. The low polydispersity polymer should have a molecular weight distribution, or polydispersity, ($M_w/M_n$, "MWD") within the range of about 1 to about 4, preferably about 1.5 to about 4, more preferably about 2 to about 4, and even more preferably from about 2 to about 3. The ratio of the third moment to the second moment, $M_z/M_w$, is generally below about 2.3, preferably below about 2.0, and more typically in the range of from about 1.6 to about 1.95. The melt flow ratio (MFR) of these resins, defined as $I_{20}/I_2$ and as determined in accordance to ASTM D-1238, is generally from about 12 to about 22, preferably from about 14 to about 20, and more preferably from about 16 to about 18. The melt index (MI), defined as the $I_2$ value, should be in the range of from about 0.5 to about 10 g/10 min., preferably from about 1 to about 5 g/ 10 min. If additional resin materials are to be incorporated with the low polydispersity polymer, it is preferred to maintain the level of the low polydispersity-polymer to at least about 60 weight percent of the inner polymeric layer.

Useful low polydispersity polymers are available from, among others, Dow Chemical Company and Exxon Chemical Company who are producers of single site or constrained geometry catalyzed polyethylenes. These resins are commercially available as the AFFINITY and EXXACT polyethylenes (see *Plastics World*, p.33–36, January 1995), and also as the ENHANCED POLYETHYLENE and EXCEED line of resins. The manufacture of such polyethylenes, generally by way of employing a metallocene catalyst system, is set forth in, among others, U.S. Pat. Nos. 5,382,631, 5,380,810, 5,358,792, 5,206,075, 5, 183,867, 5,124,418, 5,084,534, 5,079,205, 5,032,652, 5,026,798, 5,017,655, 5,006,500, 5,001,205, 4,937,301, 4,925,821, 4,871,523, 4,871,705, and 4,808,561, each of which is incorporated herein by reference in its entirety. These catalyst systems and their use to prepare such copolymer materials are also set forth in EP 0 600 425 A1 and PCT applications WO 94/25271 and 94/26816. The low polydispersity polymers thus produced generally have a crystalline content in excess of at least 10 weight percent, generally in excess of at least 15 weight percent.

The above patents and publications generally report that these catalysts contain one or more cyclopentadienyl moieties in combination with a transition metal. The metallocene catalyst may be represented by the general formula $C_cMA_aB_b$ wherein C is a substituted or unsubstituted cyclopentadienyl ring; M is a Group 3-10 metal or Lanthanide series element, generally a Group IVB, VB, or VIB metal; A and B are independently halogen, hydrocarbyl group, or hydrocarboxyl groups having 1–20 carbon atoms; a=0–3, b=0–3, and c=1–3. The reactions can take place in either gas phase, high pressure, slurry, or solution polymerization schemes.

At least one of the inner polymeric layers of the present invention is preferably constructed entirely with a low polydispersity polyethylene polymer, preferably produced by metallocene catalyst technology. However, the inner polymeric layer may also comprise a blend of the low polydispersity polymer with a second resin material. The second material may be an olefin polymer resin. For example, this may include, but is not limited to, LLDPE, LDPE, HPLDPE, VLDPE, propylene resins or combinations thereof. The second resin material is preferably a LLDPE resin having a density of from about 0.89 to about 0.94 g/cm$^3$, a LDPE resin having a density of from about 0.9 to about 0.935 g/cm$^3$, a VLDPE resin having a density of from about 0.88 to about 0.91 g/cm$^3$. The comonomer for the second resin material preferably has from about 4 to about 10, more preferably about 6 to about 8 carbon atoms. If the second resin material is to be incorporated with the metallocene-catalyzed resin, it is preferred to maintain the level of the metallocene-catalyzed resin to at least about 60 wt. % of the inner polymeric layer. The resultant blended polymer resin maintains the desired properties of the metallocene-catalyzed resin material and may be more economical for certain applications.

CORE LAYER

The multilayer stretch wrap films of the present invention contains at least one core layer which is also located between the outer cling layers. The resin utilized in the core layer contributes to the ability of the multilayer films of the present invention to strain harden during the use of the film. The strain hardening characteristic can be generally described as the higher force necessary to further stretch the film beyond its already stretched state. This characteristic is best illustrated in the machine directional (MD) stress @ 200%, 250%, 300% and 350% elongation tests.

Resins useful for preparing the core layer include random copolymers of propylene and ethylene with an ethylene content in the range of from about 2 to about 6 wt. %, preferably from about 2.5 to about 5.0 wt. % and most preferably from about 3.0 to about 4.5 wt. % of the core layer. The random ethylene-propylene copolymers have a melt flow ratio, defined as $I_{20}/I_2$ and as determined in accordance to ASTM D-1238, of from about 2 to about 15, preferably from about 3 to about 11, and more preferably from about 4 to about 7.

Alternatively, the core layer may be prepared with heterophasic copolymers of propylene and ethylene. These heterophasic copolymers comprise a propylene material with domains of ethylene interspersed. Useful heterophasic copolymers of propylene and ethylene are available from, among others, Himont, Inc. The heterophasic copolymers of propylene and ethylene have a melt flow ratio, defined as $I_{20}/I_2$ and as determined in accordance to ASTM D-1238, of from about 10 to about 18, preferably from about 11 to about 16 and more preferably from about 12 to about 15. The ethylene content is in a range from about 12 to about 30 wt. %, preferably about 15 to about 26 wt. % and more preferably about 17 to about 24 wt. % of the core layer.

Lastly, the core layer may be prepared with polypropylene homopolymers. The polypropylene homopolymers have a melt flow ratio, defined as $I_{20}/I_2$ and as determined in accordance to ASTM D-1238, of from about 2 to about 15, preferably from about 3 to about 11, and more preferably from about 4 to about 7.

It is contemplated that the core layer can comprise blends of the above-described resins. For example, a heterophasic copolymer may be blended with various types of random copolymers of propylene and ethylene in varying amounts. In addition, the core layers comprised of either heterophasic copolymers, random copolymers of propylene and ethylene, or polypropylene homopolymers may be blended with olefin polymeric resins. These resins may include, but are not limited to, LLDPE, LDPE, HPLDPE, VLDPE, propylene resins or combinations thereof. It is preferable to maintain the level of the heterophasic copolymers, the random copolymers of propylene and ethylene, and the polypropylene homopolymers to at least about 50 wt. % of the core layer.

The stretch wrap films of the present invention can be constructed to contain a plurality of layers in various combinations. According to one embodiment, the stretch wrap film will be of an A\B\C\A construction as depicted in FIG. 1 wherein the film layers (10) are the outer cling layers (layers A), film layer (20) is the inner polymeric layer (layer B), and film layer (30) is the core layer (layer C).

Figure 1:
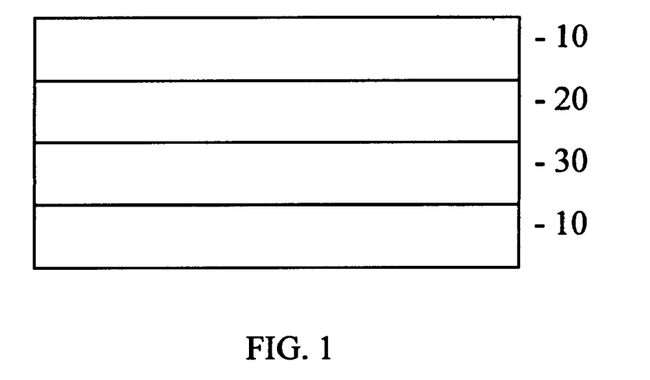
FIG. 1 shows a four layer film constructed according to one embodiment of the present invention.
Figure 2:
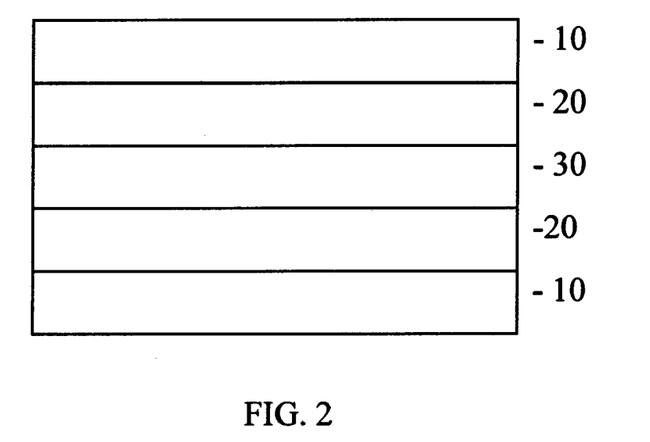
FIG. 2 shows a five layer film constructed according to one embodiment of the present invention.
Figure 3:
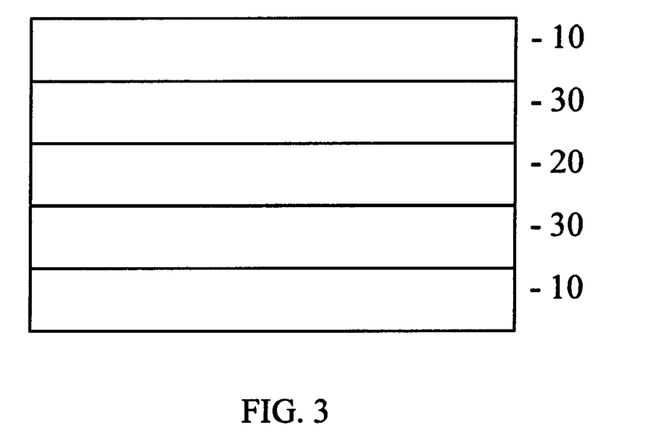
FIG. 3 shows a five layer film constructed according to another embodiment of the present invention.

According to other embodiments, the stretch wrap film may be of an A\B\C\B\A or A\C\B\C\A construction such as those depicted in FIGS. 2 and 3 where the film layers (10), (20), (30), are the outer cling, inner polymeric, and core layers, respectively, as previously described with respect to FIG. 1. Alternatively, stretch wrap films may be of an A\B\B\C\A or an A\B\C\C\A construction. Other types of multi-layered constructions are contemplated.

STRETCH WRAP PROPERTIES

The overall properties of the stretch wrap film of the present invention are such that it has a cling force to itself of at least about 140, generally at least about 180, preferably at least about 200, more preferably at least about 220, and in some cases at least 260 grams/inch as determined by ASTM D5458-94. Generally, the cling force of the film will be in the range of from about 140 to about 280 grams/inch.

The stretch wrap film of this invention can, if desired, be provided in the non-stretched, i.e., unoriented, or at most only modestly stretched state prior to use. The films of the present invention are capable of being stretched from at least about 340, preferably at least about 375 and most preferably at least about 400 linear percent.

The overall stretch wrap films have relatively high puncture resistance, as measured by the F-50 dart drop test procedure (ASTM D1709). It is the experience of those skilled in the art that the F-50 dart drop test is well correlated to the end use puncture resistance of stretch wrap films. The F-50 dart drop value of the films is at least about 150 grams, preferably at least about 200 grams, and more preferably from at least about 300 grams.

The stretch wrap films of the present invention are preferably constructed so that the transverse direction tear resistance (TD tear), as determined by ASTM D1922, is at least about 500 g/mil, preferably at least about 600 g/mil, more preferably at least about 700 g/mil. The machine direction tear resistance (MD tear) as determined by ASTM D 1922, of the film is generally at least about 175 g/mil, preferably at least about 225 g/mil, and more preferably at least about 275 g/mil.

A parameter used to analyze the performance of stretch wrap films is the stress that results when the film is stretched a desired percentage of its original length. This stress is indicative of the load retention characteristics of the film and is determined in accordance with ASTM D882. The films of the present invention generally have a stress level at 200% elongation of from about 1400 psi to about 1900 psi, and more preferably from about 1600 to about 1800 psi. The films of the present invention generally have a stress level at 250% elongation of from about 1600 psi to about 2000 psi, and more preferably from about 1700 to about 1900 psi.

The stretch wrap films of the present invention are preferably constructed so that the stretch force is from about 1.5 to about 2.2 lbs./inch.

The film configurations are constructed according to conventional practices. Generally, the preferred processing technique is to coextrude and cast the films in a simultaneous fashion, however in some cases it may be appropriate to first coextrude at least two film layers and thereafter extrusion coat the remaining film layers. It is preferred to employ known and conventional techniques of coextrusion to assemble the composite structures of the films of this invention. Reference may be made to U.S. Pat. No. 3,748,962, the contents of which are incorporated herein by reference for details of a coextrusion procedure which can be employed in the fabrication of a multilayer film in accordance with this invention. Generally, the resin materials are heated to their molten state and their viscosities are coordinated to prepare multilayer films in a uniform manner. The molten materials are conveyed to a coextrusion adapter that combines the molten materials to form a multilayer coextruded structure. The layered polymeric material is transferred through an extrusion die opened to a predetermined gap commonly in the range of between from 0.05 in. (0.13 cm) to about 0.012 in. (0.03 cm). The material is then drawn down to the intended gauge thickness by means of a primary chill or casting roll maintained at about 60 to about 130° F. (15–55° C.). Typical draw down ratios range from about 5:1 to about 40:1.

The overall thickness of the stretch wrap film can vary widely according to end use specifications, but is generally in the range of the typical thicknesses for stretch wrap films. Conventional for such films is a thickness of from about 0.4 to about 3 mils, and is application specific.

In the present invention wherein the multilayer films are of a coextruded nature, the outer cling layers may comprise from about 10 to about 50, preferably from about 10 to about 40, and more preferably from about 15 to about 30, weight percent of the stretch wrap film. The inner polymeric layer (s) may comprise from about 40 to about 85, preferably from about 40 to about 80, and more preferably from about 60 to about 75, weight percent of the stretch wrap film. The core layer(s) will account for the balance of the film, and generally will comprise from about 2 to about 50, preferably from about 5 to about 25, and more preferably from about 5 to about 15, weight percent of the stretch wrap film.

It has been found that the benefits provided from the core layer(s) are substantially obtained with up to about 7 weight percent, preferably up to about 12 weight percent, of the stretch wrap film. The incorporation of the core layer at these levels, in conjunction with the incorporation of the inner polymeric layer, has led to an unexpected moderation of holding force while still maintaining excellent stretch. These properties have been found to be appreciably enhanced surprisingly without a significant loss of other important film properties, and as a result the overall film stretch wrap performance has been enhanced.

The pallet unitizing techniques described in U.S. Pat. Nos. 3,986,611 and 4,050,221 are contemplated herein. The disclosures of these patents are incorporated herein by reference in their entirety.

EXAMPLE

A number of tests were done to demonstrate various aspects of the multilayer films of the present invention. The procedures utilized are set forth in Table 1.

TABLE 1

STRETCH FILM TEST PROCEDURES

| TEST PROCEDURE | ASTM TEST METHOD |
|---|---|
| Tensile Yield Machine Direction (MD) and Transverse Direction (TD) | D882 |
| Tensile Ultimate MD & TD | D882 |
| Tensile Elongation MD & TD | D882 |
| Tensile MD & TD Force @ | |
| 200% Stretch | D882 |
| 250% Stretch | D882 |
| 300% Stretch | D882 |
| 350% Stretch | D882 |
| Elmendorf Tear MD | D1922 |
| Elmendorf Tear TD | D1922 |
| Total Energy Dart Drop | D4272 |
| F-50 Dart Drop | D1709 |
| Instron Peel Cling | D5458 |
| Instron Probe Puncture Energy | — |

The probe energy test was conducted by use of an Instron Universal tester that records a continuous reading of the force (stress) and penetration (strain) curve. A 6 in. by 6 in. film specimen is securely mounted to a compression load cell to expose a 4 in. by 4 in. area. A hemispherically shaped (1 in. dia.) stainless steel probe, traveling at a constant speed of 10 in./min. is lowered into the film. A stress/strain curve is recorded and plotted. Peak force is the maximum force encountered. The machine is used to integrate the area under the curve, which is indicative of the energy consumed during the penetration to rupture testing of the film.

The films were prepared using a commercially available cast film line machine. The material melt temperatures ranged from about 380 to about 580° F. and were chosen to match melt viscosities of the various resins. The melts were conveyed to a coextrusion adapter that combines the melt flows into a multilayer coextruded structure. This layered flow was distributed through a single manifold film extrusion die to the required width. The die gap opening was nominally 0.025 inches. The material was drawn down to the final gauge. The material draw down ratio was about 31:1 for the 0.8 mil films. A vacuum box was used to pin the melt exiting the die opening to a primary chill roll maintained at about 90° F.

The films were tested for performance in a stretch wrapper constructed with equipment to determine various film properties during the stretching operation. The testing was conducted at rates similar to those employed by commercial equipment. The film width was 20 inches for this test machine. The machine direction (MD) force at 200% stretch and maximum stretch % were determined.

The results of the tests appear in Tables 2 and 3. In Table 2, the comparative films were films 1–4 and the inventive films were films 5–12. The comparative films 1 and 2 were compared with inventive films 5–10, while comparative films 3 and 4 were compared with inventive films 11 and 12. In Table 3, the comparative films were 1–2 and the inventive films were films 13–14.

All of the inventive films and the comparative films were coextruded in a five layer construction of A/B/C/B/A. The outer film layers A (cling layers) of the inventive films 5–14 were comprised of a linear low density polyethylene (LLDPE) resin. The LLDPE resin in layers A had a density of 0.917 g/cm$^3$ and a melt index (I$^2$) of 3.3 g/110 min.

The inner polymeric layers B of each inventive film (films 5–14) were comprised of 100% metallocene-catalyzed linear low density polyethylene or "mLLDPE". Film layers B were formed from an alpha olefin comonomer of 1-hexene. The core layer C of inventive films 5–12 was comprised of a random copolymer of propylene and ethylene having a varying amount of ethylene and varying melt flow ratios (see "P/E Copolymer" in Table 2). In the inventive films 5–12 of Table 2, the ethylene content ranged from 3.0 to 4.5 wt. % of the core layer, while the melt flow ratios ranged from 4.5 to 6.5. Referring to Table 3, the core layer C of inventive films 13–14 was comprised of a heterophasic copolymer of propylene with domains of ethylene interspersed. The heterophasic copolymer had an ethylene content of 18 wt. % of the core layer and a melt flow ratio of 12.0 (see "Heterophasic P/E" in Table 3).

The comparative films (films 1–4) in Tables 2 and 3 were comprised of the same outer layer resin A and the same inner layer resin B as described above in the inventive films. The core layer C of the comparative films 1–4 was comprised of a low density polyethylene resin (LDPE) having a melt index of 2.0 g/10 min. and a density of 0.918 g/cm$^3$.

All of the comparative films 1–4 and the inventive films 5–14 comprised about 20 wt. % of layers A (outer film layers), about 70 wt. % of layers B (inner layers) and about 10 wt. % of layer C (core layer). Specifically, each outer film layer of A was about 10 wt. % and each inner polymeric layer B was about 35 wt. %. However, it is not necessary for each of the outer film layers A to have equal weight percents. Similarly, it is not necessary for each of the inner polymeric layers B to have equal weight percents.

Referring to Table 2, the inventive films 5–10 generally had approximately equivalent maximum stretch values than the average of the maximum stretch for comparative films 1 and 2 (see maximum stretch %). The inventive films 5–10 generally had lower stress values when the film is stretched a desired percentage of its original length when compared to comparative films 1 and 2 (see MD Stress @ 200%, 250%, 300% and 350%). Inventive films 5–10 had higher F-50 dart drop values and total energy dart drop values than the average of the comparative films 1 and 2.

Inventive films 11 and 12 had a lower maximum stretch value than comparative films 3 and 4 (see maximum stretch %). Inventive films 11 and 12 also had a higher F-50 dart drop and a total energy dart drop than comparative films 3 and 4. The inventive films 11 and 12 showed a moderate holding force compared to the comparative films 3 and 4 (see MD Stress @ 200%, 250%, 300% and 350%).

Referring to Table 3, the inventive films 13 and 14 (core layers comprised of a heterophasic copolymer of propylene and ethylene) had higher maximum stretch values than the average of the values for comparative films 1 and 2 (see maximum stretch %). The inventive films 13 and 14 had lower stress values when the film is stretched a desired percentage of its original length as compared to comparative films 1 and 2 (see MD Stress @ 200%, 250%, 300% and 350%). Inventive films 13 and 14 had similar F-50 dart drop values, but had higher total energy dart drop values than the comparative films 1 and 2.

TABLE 2

| SAMPLE No. | Comparative Films 1 | Comparative Films 2 | Inventive Films 5 | Inventive Films 6 | Inventive Films 7 | Inventive Films 8 | Inventive Films 9 | Inventive Films 10 | Comparative Films 3 | Comparative Films 4 | Inventive Films 11 | Inventive Films 12 |
|---|---|---|---|---|---|---|---|---|---|---|---|---|
| Average Gauge (mils) | 0.8 | 0.8 | 0.8 | 0.8 | 0.8 | 0.8 | 0.8 | 0.8 | 0.8 | 0.8 | 0.8 | 0.8 |
| Draw Distance (inch) | 2.5 | 1.25 | 1.25 | 2.5 | 2.5 | 1.25 | 1.25 | 2.5 | 2.5 | 1.25 | 2.5 | 1.25 |
| Layer Configuration | A/B/C/B/A | A/B/C/B/A | A/B/C/B/A | A/B/C/B/A | A/B/C/B/A | A/B/C/B/A | A/B/C/B/A | A/B/C/B/A | A/B/C/B/A | A/B/C/B/A | A/B/C/B/A | A/B/C/B/A |
| Layer "A"% | 20 | 20 | 20 | 20 | 20 | 20 | 20 | 20 | 20 | 20 | 20 | 20 |
| Layer "B"% | 70 | 70 | 70 | 70 | 70 | 70 | 70 | 70 | 70 | 70 | 70 | 70 |
| Layer "C"% | 10 | 10 | 10 | 10 | 10 | 10 | 10 | 10 | 10 | 10 | 10 | 10 |
| Layer "A" Resin | 3.3 MI LLDPE | 3.3 MI LLDPE | 3.3 MI LLDPE | 3.3 MI LLDPE | 3.3 MI LLDPE | 3.3 MI LLDPE | 3.3 MI LLDPE | 3.3 MI LLDPE | 3.3 MI LLDPE | 3.3 MI LLDPE | 3.3 MI LLDPE | 3.3 MI LLDPE |
| Layer "B" Resin | 2.2 MI mLLDPE | 2.2 MI mLLDPE | 2.2 MI mLLDPE | 2.2 MI mLLDPE | 2.2 MI mLLDPE | 2.2 MI mLLDPE | 2.2 MI mLLDPE | 2.2 MI mLLDPE | 2.2 MI mLLDPE | 2.2 MI mLLDPE | 2.2 MI mLLDPE | 2.2 MI mLLDPE |
| Layer "C" Resins | 2.0 MI LDPE | 2.0 MI LDPE | 6.5 MFR E/P Copoly | 6.5 MFR E/P Copoly | 4.5 MFR E/P Copoly | 4.5 MFR E/P Copoly | 4.6 MFR E/P Copoly | 4.6 MFR E/P Copoly | 2.0 MI LDPE | 2.0 MI LDPE | 6.8 MFR E/P Copoly | 6.8 MFR E/P Copoly |
| Ethylene wt. % | 100 | 100 | 3.2 | 3.2 | 3.0 | 3.0 | 4.5 | 4.5 | 100 | 100 | 4.5 | 4.5 |
| LAB ANALYSIS | | | | | | | | | | | | |
| MD Ultimate (psi) | 6,003 | 5,845 | 5,495 | 4,777 | 7,125 | 8,015 | 7,739 | 7,715 | 5714 | 5,877 | 6,700 | 7,241 |
| MD Elongation (%) | 658 | 618 | 550 | 546 | 630 | 606 | 597 | 645 | 658 | 633 | 620 | 608 |
| MD Stress @ 200% (psi) | 2,051 | 2,208 | 1,662 | 1,629 | 1,655 | 1,775 | 1,793 | 1,693 | 1,993 | 2,164 | 1,608 | 1,644 |
| MD Stress @ 250% (psi) | 2,179 | 2,337 | 1,825 | 1,765 | 1,831 | 2,016 | 2,019 | 1,874 | 2,094 | 2,287 | 1,770 | 1,830 |
| MD Stress @ 300% (psi) | 2,350 | 2,526 | 2,094 | 2,000 | 2,090 | 2,345 | 2,335 | 2,139 | 2,267 | 2,474 | 2,019 | 2,107 |
| MD Stress @ 350% (psi) | 2,592 | 2,780 | 2,445 | 2,322 | 2,461 | 2,811 | 2,786 | 2,511 | 2,482 | 2,723 | 2,357 | 2,508 |
| MD Tear (grams/mil) | 270 | 251 | 356 | 344 | 327 | 252 | 304 | 342 | 250 | 182 | 326 | 330 |
| TD Tear (grams/mil) | 927 | 856 | 784 | 784 | 712 | 744 | 807 | 767 | 767 | 887 | 800 | 864 |
| Probe Puncture (in-lbs) | 11.2 | 11 | 7.7 | 8.3 | 8.4 | 8.8 | 9.4 | 9.1 | 8.6 | 8 | 7.3 | 7.4 |
| F-50 Dart Drop (g) | 267 | 215 | 218 | 284 | 305 | 230 | 256 | 248 | 185 | 236 | 245 | 262 |
| Total Energy Dart Drop (TEDD) (in-lbs) | 9.1 | 9.8 | 18 | 21.5 | 24 | 21.9 | 26.6 | 30.8 | 11.6 | 11 | 20.5 | 15.1 |
| STRETCH WRAP TESTER | | | | | | | | | | | | |
| MD Force @ 200% Stretch (lbs/in) | 2.12 | 2.45 | 1.75 | 1.76 | 1.86 | 2.26 | 1.88 | 2.08 | 2.1 | 2.4 | 1.65 | 1.77 |
| Maximum Force (lbs/in) | 2.69 | 2.69 | 2.49 | 2.44 | 2.31 | 3.13 | 2.56 | 2.62 | 2.66 | 2.82 | 2.42 | 2.35 |
| Maximum Stretch % | 406 | 322 | 374 | 400 | 363 | 357 | 350 | 376 | 414 | 399 | 387 | 342 |

TABLE 3

|  | Comparative Films | | Inventive Films | |
| --- | --- | --- | --- | --- |
| SAMPLE No. | 1 | 2 | 13 | 14 |
| Average Gauge (mils) | 0.8 | 0.8 | 0.8 | 0.8 |
| Draw Distance (inch) | 2.5 | 1.25 | 2.5 | 1.25 |
| Layer Configuration | A/B/C/B/A | A/B/C/B/A | A/B/C/B/A | A/B/C/B/A |
| Layer "A" % | 20 | 20 | 20 | 20 |
| Layer "B" % | 70 | 70 | 70 | 70 |
| Layer "C" % | 10 | 10 | 10 | 10 |
| Layer "A" Resin | 3.3 MI LLDPE | 3.3 MI LLDPE | 3.3 MI LLDPE | 3.3 MI LLDPE |
| Layer "B" Resin | 2.2 MI mLLDPE | 2.2 MI mLLDPE | 2.2 MI mLLDPE | 2.2 MI mLLDPE |
| Layer "C" Resins | 2.0 MI LDPE | 2.0 MI LDPE | 12 MFR Heterophasic P/E | 12 MFR Heterophasic P/E |
| Ethylene wt. % | 100 | 100 | 18 | 18 |
| LAB ANALYSIS | | | | |
| MD Ultimate (psi) | 6,003 | 5,845 | 7,050 | 6,496 |
| MD Elongation (%) | 658 | 618 | 613 | 646 |
| MD Stress @ 200% (psi) | 2,051 | 2,208 | 1,681 | 1,599 |
| MD Stress @ 250% (psi) | 2,179 | 2,337 | 1,806 | 1,685 |
| MD Stress @ 300% (psi) | 2,350 | 2,526 | 2,034 | 1,885 |
| MD Stress @ 350% (psi) | 2,592 | 2,780 | 2,368 | 2,157 |
| MD Tear (grams/mil) | 270 | 251 | 307 | 342 |
| TD Tear (grams/mil) | 927 | 856 | 687 | 680 |
| Probe - ¾" (in-lbs) | 11.2 | 11 | 9 | 8.8 |
| F-50 Dart Drop (g) | 267 | 215 | 233 | 238 |
| Total Energy Dart Drop (TEDD) (in-lbs) | 9.1 | 9.8 | 20.1 | 18.6 |
| STRETCH WRAP TESTER | | | | |
| MD Force @ 200% Stretch (lbs/in) | 2.12 | 2.45 | 1.67 | 1.63 |
| Maximum Force (lbs/in) | 2.69 | 2.69 | 2.44 | 2.22 |
| Maximum Stretch % | 406 | 322 | 409 | 376 |

What is claimed is:

1. A multilayer, thermoplastic stretch wrap film containing at least four polymeric film layers, comprising:
   (a) a first outer cling layer;
   (b) a second outer cling layer, at least one of said first outer cling layer and second outer cling layer having sufficient cling resulting from inherent cling alone, cling additives alone or a combination thereof so as to produce a cling force to the other outer cling layer of at least about 140 grams/inch;
   (c) at least one inner polymeric layer, located between said first and second outer cling layers, comprising a low polydispersity polymer, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22, and
   (d) at least one core layer, also located between said first and second outer cling layers, comprising a copolymer of propylene and ethylene, said copolymer having a melt flow ratio ($I_{20}/I_2$) of from about 2 to about 15 and an ethylene content in the range of from about 2 to about 6 wt. %;
   wherein the stretch wrap film has an elongation of at least 340% and a machine direction stress level at 200% elongation of from about 1400 to about 1900 psi.

2. The stretch wrap film of claim 1 wherein the ethylene content of said copolymer is in the range of from about 2.5 to about 5.0 wt. %.

3. The stretch wrap film of claim 2 wherein the ethylene content of said copolymer is in the range of from about 3.0 to about 4.5 wt. %.

4. The stretch wrap film of claim 1 wherein the melt flow ratio of said copolymer is in the range of from about 3 to about 11.

5. The stretch wrap film of claim 4 wherein the melt flow ratio of said copolymer is in the range of from about 4 to about 7.

6. The stretch wrap film of claim 1 wherein said polydispersity of said low polydispersity polymer is in the range of from about 1.5 to about 4.

7. The stretch wrap film of claim 6 wherein said polydispersity of said low polydispersity polymer is in the range of from about 2 to about 3.

8. The stretch wrap film of claim 1 wherein the density of said low polydispersity polymer is in the range of from about 0.88 to about 0.93 g/cm³.

9. The stretch wrap film of claim 8 wherein the density of said low polydispersity polymer is in the range of from about 0.88 to about 0.925 g/cm³.

10. The stretch wrap film of claim 1 wherein the melt index of said low polydispersity polymer is in the range of from about 0.5 to about 5 g/10 min.

11. The stretch wrap film of claim 10 wherein the melt index of said low polydispersity polymer is in the range of from about 0.5 to about 2 g/10 min.

12. The stretch wrap film of claim 1 wherein the melt flow ratio of said low polydispersitypolymer is in the range of from about 14 to about 20.

13. The stretch wrap film of claim 12 wherein the melt flow ratio of said low polydispersity polymer is in the range of from about 16 to about 18.

14. The stretch wrap film of claim 1 wherein said low polydispersity polymer is made with a metallocene catalyst.

15. The stretch wrap film of claim 1 wherein at least one of said first outer cling layer and said second outer cling layer have a cling force to the other outer cling layer of at least about 180 grams/inch.

16. The stretch wrap film of claim 15 wherein at least one of said first outer cling layer and said second outer cling layer have a cling force to the other outer cling layer of at least about 220 grams/inch.

17. The stretch wrap film of claim 1 wherein the transverse direction tear resistance of the stretch wrap film is at least about 500 g/mil.

18. The stretch wrap film of claim 17 wherein the transverse direction tear resistance of the stretch wrap film is at least about 550 g/mil.

19. The stretch wrap film of claim 18 wherein the transverse direction tear resistance of the stretch wrap film is at least about 600 g/mil.

20. The stretch wrap film of claim 1 wherein the machine direction tear resistance of the stretch wrap film is at least about 125 g/mil.

21. The stretch wrap film of claim 20 wherein the machine direction tear resistance of the stretch wrap film is at least about 150 g/mil.

22. The stretch wrap film of claim 21 wherein the machine direction tear resistance of the stretch wrap film is at least about 175 g/mil.

23. The stretch wrap film of claim 1 wherein at least one of said first outer cling layer and said second outer cling layer is a polymer comprising two or more monomers, wherein the first monomer is ethylene, in a major amount by weight, and the second monomer is an alpha olefin of from about 3 to about 12 carbon atoms, in a minor amount by weight.

24. The stretch wrap film of claim 23 wherein the second monomer of at least one of said first outer cling layer and said second outer cling layer is independently selected from the group consisting of propylene, 1-butene, 1-pentene, 1-hexene, 3-methyl-1-pentene, 4-methyl-1-pentene, 1-octene, 1-decene, and 1-dodecene.

25. The stretch wrap film of claim 1 wherein the low polydispersity polymer comprises a polyethylene copolymer or terpolymer.

26. The stretch wrap film of claim 1 having a machine direction stress level at 200% elongation of from about 1600 to about 1800 psi.

27. The stretch wrap film of claim 1 having a machine direction stress level at 250% elongation of from about 1600 to about 2000 psi.

28. The stretch wrap film of claim 27 having a machine direction stress level at 250% elongation of from about 1700 to about 1900 psi.

29. The stretch wrap film of claim 1 wherein the film has an elongation of at least about 375%.

30. The stretch wrap film of claim 29 wherein the film has an elongation of at least about 400%.

31. The stretch wrap film of claim 1 wherein the low polydispersity polymer is blended with at least one olefin polymeric resin.

32. The stretch wrap film of claim 1 wherein the copolymer of propylene and ethylene is blended with at least one olefin polymeric resin.

33. The stretch wrap film of claim 1 wherein said inherent cling is partially from n-hexane extractibles.

34. The stretch wrap film of claim 1 wherein said cling force is partially from at least one cling additive.

35. The stretch wrap film of claim 34 wherein said cling additive is poly-isobutylene.

36. The stretch wrap film of claim 1 wherein said first outer cling layer and said second outer cling layer are made from olefin polymer resins.

37. The stretch wrap film of claim 36 wherein at least one of said olefin polymer resins is a copolymer, said copolymer comprising an olefin monomer with a second monomer.

38. The stretch wrap film of claim 37 wherein said olefin polymer resin is an ethylene-acrylate polymer, wherein the acrylate of said ethylene-acrylate polymer is selected from the group consisting of methyl acrylate, ethyl acrylate, and n-butyl acrylate.

39. The stretch wrap film of claim 1 wherein said first outer cling layer and said second outer cling layer are independently selected from the group consisting of linear low density polyethylene, very low density polyethylene, high pressure low density polyethylene, ethylene-acrylate polymers and mixtures thereof.

40. The stretch wrap film of claim 39 wherein the acrylate of said ethylene-acrylate polymers is selected from the group consisting of methylacrylate, ethylacrylate, and n-butyl acrylate.

41. A multilayer, thermoplastic stretch wrap film containing at least four polymeric film layers, comprising:
   (a) a first outer cling layer;
   (b) a second outer cling layer, at least one of said first outer cling layer and second outer cling layer having sufficient cling resulting from inherent cling alone, cling additives alone or a combination thereof so as to produce a cling force to the other outer cling layer of at least about 140 grams/inch;
   (c) at least one inner layer, located between the first and second outer cling layers, comprising a low polydispersity polymer, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22; and
   (d) a core layer, also located between said first and second outer cling layers, comprising a heterophasic copolymer of propylene and ethylene, said heterophasic copolymer having a melt flow ratio ($I_{20}/I_2$) of from about 10 to about 18 and an ethylene content in the range of from about 12 to about 30 wt. %;
   wherein the stretch wrap film has an elongation of at least 340% and a machine direction stress force at 200% elongation of from about 1400 to about 1900 psi.

42. The stretch wrap film of claim 41 wherein the melt flow ratio of the heterophasic copolymer is in the range of from about 11 to about 16.

43. The stretch wrap film of claim 42 wherein the melt flow ratio of the heterophasic copolymer is in the range of from about 12 to about 15.

44. The stretch wrap film of claim 41 wherein the ethylene content of the heterophasic copolymer is in the range of from about 15 to about 26 wt. %.

45. The stretch wrap film of claim 44 wherein said ethylene content of the heterophasic copolymer is in the range of from about 17 to about 24 wt. %.

46. The stretch wrap film of claim 41 wherein the density of said low polydispersity polymer is in the range of from about 0.88 to about 0.93 g/cm$^3$.

47. The stretch wrap film of claim 46 wherein the density of said low polydispersity polymer is in the range of from about 0.88 to about 0.925 g/cm$^3$.

48. The stretch wrap film of claim 41 wherein the melt index of said low polydispersity polymer is in the range of about 0.5 to about 5 g/10 min.

49. The stretch wrap film of claim 48 wherein the melt index of said low polydispersity polymer is in the range of about 0.5 to about 2 g/10 min.

50. The stretch wrap film of claim 41 wherein the melt flow ratio of said low polydispersity polymer is in the range of from about 14 to about 20.

51. The stretch wrap film of claim 50 wherein the melt flow ratio of said low polydispersity polymer is in the range of from about 16 to about 18.

52. The stretch wrap film of claim 44 wherein said low polydispersity polymer is made with a metallocene catalyst.

53. The stretch wrap film of claim 41 wherein at least one of said first outer cling layer and said second outer cling layer have a cling force to the other outer cling layer of at least about 180 grams/inch.

54. The stretch wrap film of claim 53 wherein at least one of said first outer cling layer and said second outer cling layer have a cling force to the other outer cling layer of at least about 220 grams/inch.

55. The stretch wrap film of claim 41 wherein the transverse direction tear resistance of the stretch wrap film is at least about 500 g/mil.

56. The stretch wrap film of claim 55 wherein the transverse direction tear resistance of the stretch wrap film is at least about 550 g/mil.

57. The stretch wrap film of claim 56 wherein the transverse direction tear resistance of the stretch wrap film is at least about 600 g/mil.

58. The stretch wrap film of claim 41 wherein the machine direction tear resistance of the stretch wrap film is at least about 125 g/mil.

59. The stretch wrap film of claim 58 wherein the machine direction tear resistance of the stretch wrap film is at least about 150 g/mil.

60. The stretch wrap film of claim 59 wherein the machine direction tear resistance of the stretch wrap film is at least about 175 g/mil.

61. The stretch wrap film of claim 41 wherein at least one of said first outer cling layer and said second outer cling layer is a polymer comprising two or more monomers, wherein the first monomer is ethylene, in a major amount by weight, and the second monomer is an alpha olefin of from about 3 to about 12 carbon atoms, in a minor amount by weight.

62. The stretch wrap film of claim 61 wherein the second monomer of at least one of said first outer cling layer and said second outer cling layer is independently selected from the group consisting of propylene, 1-butene, 1-pentene, 1-hexene, 3-methyl-1-pentene, 4-methyl-1-pentene, 1-octene, 1-decene, and 1-dodecene.

63. The stretch wrap film of claim 41 wherein the low polydispersity polymer comprises a polyethylene copolymer or terpolymer.

64. The stretch wrap film of claim 41 having the machine direction stress level at 200% elongation of from about 1600 to about 1800 psi.

65. The stretch wrap film of claim 41 having the machine direction stress level at 250% elongation of from about 1600 psi to about 2000 psi.

66. The stretch wrap film of claim 65 having the machine direction stress level at 250% elongation of from about 1700 to about 1900 psi.

67. The stretch wrap film of claim 41 wherein the film has an elongation of at least about 375%.

68. The stretch wrap film of claim 67 wherein the film has an elongation of at least about 400%.

69. The stretch wrap film of claim 41 wherein the low polydispersity polymer is blended with at least one olefin polymeric resin.

70. The stretch wrap film of claim 41 wherein the heterophasic copolymer of propylene and ethylene is blended with at least one olefin polymeric resin.

71. The stretch wrap film of claim 41 wherein said inherent cling is partially from n-hexane extractibles.

72. The stretch wrap film of claim 41 wherein said cling force is partially from at least one cling additive.

73. The stretch wrap film of claim 72 wherein said cling additive is poly-isobutylene.

74. The stretch wrap film of claim 41 wherein said first outer cling layer and said second outer cling layer are made from olefin polymer resins.

75. The stretch wrap film of claim 74 wherein at least one of said olefin polymer resins is a copolymer, said copolymer comprising an olefin monomer with a second monomer.

76. The stretch wrap film of claim 75 wherein said olefin polymer resin is an ethylene-acrylate polymer, wherein the acrylate of said ethylene-acrylate polymer is selected from the group consisting of methyl acrylate, ethyl acrylate, and n-butyl acrylate.

77. The stretch wrap film of claim 41 wherein said first outer cling layer and said second outer cling layer are independently selected from the group consisting of linear low density polyethylene, very low density polyethylene, high pressure low density polyethylene, ethylene-acrylate polymers and mixtures thereof.

78. The stretch wrap film of claim 77 wherein the acrylate of said ethylene-acrylate polymers is selected from the group consisting of methyl acrylate, ethyl acrylate and n-butyl acrylate.

79. A multilayer, thermoplastic stretch wrap film containing at least four polymeric film layers, comprising:
(a) a first outer cling layer;
(b) a second outer cling layer, at least one of said first outer cling layer and second outer cling layer having sufficient cling resulting from inherent cling alone, cling additives alone or a combination thereof so as to produce a cling force to the other outer cling layer of at least about 140 grams/inch;
(c) at least one inner polymeric layer, located between said first and second outer cling layers, comprising a low polydispersity polymer, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22; and
(d) at least one core layer, also located between said first and second outer cling layers, comprising a polypropylene homopolymer having a melt flow ratio ($I_{20}/I_2$) of from about 2 to about 15;
wherein the stretch wrap film has an elongation of at least 340% and a machine direction stress level at 200% elongation of from about 1400 to about 1900 psi.

80. The stretch wrap film of claim 79 wherein the low polydispersity polymer is blended with at least one olefin polymeric resin.

81. The stretch wrap film of claim 79 wherein the polypropylene homopolymer is blended with at least one olefin polymeric resin.

82. The stretch wrap film of claim 79 wherein said inherent cling is partially from n-hexane extractibles.

83. The stretch wrap film of claim 79 wherein said cling force is partially from at least one cling additive.

84. The stretch wrap film of claim 83 wherein said cling additive is poly-isobutylene.

85. The stretch wrap film of claim 79 wherein said first outer cling layer and said second outer cling layer are made from olefin polymer resins.

86. The stretch wrap film of claim 85 wherein at least one of said olefin polymer resins is a copolymer, said copolymer comprising an olefin monomer with a second monomer.

87. The stretch wrap film of claim 86 wherein said olefin polymer resin is an ethylene-acrylate polymer, wherein the acrylate of said ethylene-acrylate polymer is selected from the group consisting of methyl acrylate, ethyl acrylate, and n-butyl acrylate, 88. The stretch wrap film of claim 79 wherein said first outer cling layer and said second outer cling layer are independently selected from the group consisting of linear low density polyethylene, very low density polyethylene, high pressure low density polyethylene, ethylene-acrylate, polymers and mixtures thereof.

89. The stretch wrap film of claim 88 wherein the acrylate of said ethylene-acrylate polymers is selected from the group consisting of methyl acrylate, ethyl acrylate and n-butyl acrylate.

90. A multilayer, thermoplastic stretch wrap film containing at least four polymeric film layers, comprising:
   (a) a first outer polymeric layer comprising a polymer of two or more monomers, wherein a first monomer is ethylene, in a major amount by weight, and a second monomer is an alpha olefin of from about 3 to about 12 carbon atoms, in a minor amount by weight;
   (b) a second outer polymeric layer comprising a polymer of two or more monomers, wherein a first monomer is ethylene, in a major amount by weight, and a second monomer is an alpha olefin of from about 3 to about 12 carbon atoms, in a minor amount by weight;
   (c) at least one inner polymeric layer, located between said first and second outer polymeric layers, comprising a low polydispersity polymer, and optionally comprising at least one olefin polymeric resin, said low polydispersity polymer comprising a polyethylene copolymer or terpolymer, said polyethylene copolymer or terpolymer having a polydispersity of from about 1 to about 4, a melt index ($I_2$) of from about 0.5 to about 10 g/10 min., and a melt flow ratio ($I_{20}/I_2$) of from about 12 to about 22; and
   (d) at least one core layer, also located between said first and second outer cling layers, chosen from at least one of the group consisting of a copolymer of propylene and ethylene, a heterophasic copolymer of propylene and ethylene, and a polypropylene homopolymer, and optionally comprising at least one olefin polymeric resin, said copolymer of propylene and ethylene having a melt flow ratio ($I_{20}/I_2$) of from about 2 to about 15 and an ethylene content in the range of from about 2 to about 6 wt. %, said heterophasic copolymer of propylene and ethylene having a melt flow ratio ($I_{20}/I_2$) of from about 10 to about 18 and an ethylene content in the range of from about 12 to about 30 wt. %, said polypropylene homopolymer having a melt flow ratio ($I_{20}/I_2$) of from about 2 to about 15;
wherein the stretch wrap film has an elongation of at least 340% and a machine direction stress level at 200% elongation of from about 1400 to about 1900 psi.

91. A method for wrapping an article, comprising:
wrapping the article with a multilayer, thermoplastic stretch wrap film containing at least four polymeric film layers, comprising
   (a) a first outer cling layer;
   (b) a second outer cling layer, at least one of said first outer cling layer and second outer cling layer having sufficient cling resulting from inherent cling alone, cling additives alone or a combination thereof so as to produce a cling force to the other outer cling layer of at least about 140 grams/inch;
   (c) at least one inner polymeric layer, located between said first and second outer cling layers, comprising a low polydispersity polymer, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22;
   (d) at least one core layer, also located between said first and second outer cling layers, comprising an copolymer of propylene and ethylene having a melt flow ratio ($I_{20}/I_2$) of from about 2 to about 15 and an ethylene content in the range of from about 2 to about 6 wt. %;
wherein the stretch wrap film has an elongation of at least 340% and a machine direction stress level at 200% elongation of from about 1400 to about 1900 psi, and
whereby said multilayer film is stretched during the wrapping step.

92. A method of wrapping an article, comprising:
wrapping the article with a multilayer, thermoplastic stretch wrap film containing at least four polymeric film layers, comprising
   (a) a first outer cling layer;
   (b) a second outer cling layer, at least one of said first outer cling layer and second outer cling layer having sufficient cling resulting from inherent cling alone, cling additives alone or a combination thereof so as to produce a cling force to the other outer cling layer of at least about 140 grams/inch;
   (c) at least one inner layer, located between the first and second outer cling layers, comprising a low polydispersity polymer, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22; and
   (d) a core layer, also located between the first and second outer cling layers, comprising a heterophasic copolymer of propylene and ethylene having a melt flow ratio ($I_{20}I_2$) of from about 10 to about 18 and an ethylene content in the range of from about 12 to about 30 wt. %;
wherein the stretch wrap film has an elongation of at least 340% and a machine direction stress level at 200% elongation of from about 1400 to about 1900 psi, and
whereby said multilayer film is stretched during the wrapping step.

93. A multilayer, thermoplastic stretch wrap film containing at least four polymeric film layers, comprising:
   (a) a first outer polymeric layer comprising a polymer of two or more monomers, wherein a first monomer is ethylene, in a major amount by weight, and a second monomer is an alpha olefin of from about 3 to about 12 carbon atoms, in a minor amount by weight;
   (b) a second outer polymeric layer comprising a polymer of two or more monomers, wherein a first monomer is ethylene, in a major amount by weight, and a second monomer is an alpha olefin of from about 3 to about 12 carbon atoms, in a minor amount by weight, at least one of said first outer polymeric layer and said second outer polymeric layer having sufficient cling resulting from inherent cling alone, cling additives alone or a combination thereof so as to produce a cling force to the other outer polymeric layer of at least about 140 grams/inch;
   (c) at least one inner polymeric layer, located between said first and second outer polymeric layers, comprising a low polydispersity polymer, and optionally comprising at least one olefin polymeric resin, said low polydispersity polymer prepared from an ethylene and at least one alpha olefin monomer, said alpha olefin monomer having from about 3 to about 12 carbon atoms, said low polydispersity polymer having a polydispersity of from about 1 to about 4, a melt index ($I_2$) of from about 0.5 to about 10 g/10 min., and a melt flow ratio ($I_{20}/I_2$) of from about 12 to about 22; and
   (d) at least one core layer, also located between said first and second outer cling layers, chosen from at least one of the group consisting of a copolymer of propylene and ethylene, a heterophasic copolymer of propylene and ethylene, and a polypropylene homopolymer, and optionally comprising at least one olefin polymeric resin, said copolymer of propylene and ethylene having a melt flow ratio ($I_{20}/I_2$) of from about 2 to about 15 and an ethylene content in the range of from about 2 to about 6 wt. %, said heterophasic copolymer of propylene and ethylene having a melt flow ratio ($I_{20}/I_2$) of from about 10 to about 18 and an ethylene content in the range of from about 12 to about 30 wt. %, said polypropylene homopolymer having a melt flow ratio ($I_{20}/I_2$) of from about 2 to about 15;

wherein the stretch wrap film has an elongation of at least 340% and a machine direction stress level at 200% elongation of from about 1400 to about 1900 psi.

* * * * *

UNITED STATES PATENT AND TRADEMARK OFFICE
CERTIFICATE OF CORRECTION

PATENT NO. : 5,902,684

DATED : May 11, 1999

INVENTOR(S) : Edward M. Bullard et al.

It is certified that error appears in the above-indentified patent and that said Letters Patent is hereby corrected as shown below:

Column 14, Claim 12, line 44, delete "polydispersitypolymer" and insert --polydispersity polymer--

Column 16, Claim 40, line 3, delete "methylacrylate, ethylacrylate" and insert --methyl acrylate, ethyl acrylate--

Column 16, Claim 44, line 37, delete "heterophasiccopolymeris" and insert --heterophasic copolymer is--

Column 16, Claim 52, line 60, delete "44" and insert --41--

Column 18, Claim 88, line 66, after "ethylene-acrylate" delete ","

Signed and Sealed this

Twenty-eighth Day of September, 1999

Attest:

Q. TODD DICKINSON

*Attesting Officer*  *Acting Commissioner of Patents and Trademarks*